United States Patent [19]
Geronimi

[11] Patent Number: 5,296,687
[45] Date of Patent: Mar. 22, 1994

[54] METHOD OF RATIFYING SECRET CODES FOR MEMORY CARDS

[75] Inventor: François Geronimi, Aix en Provence, France

[73] Assignee: Gemplus Card International, Gemenos, France

[21] Appl. No.: 778,348

[22] Filed: Oct. 16, 1991

[30] Foreign Application Priority Data

Oct. 19, 1990 [FR] France .................. 90 12985

[51] Int. Cl.⁵ .................. G06K 5/00; B42D 15/00
[52] U.S. Cl. .................. 235/380; 283/74
[58] Field of Search .................. 235/380; 283/74

[56] References Cited

FOREIGN PATENT DOCUMENTS 0044039 1/1982 European Pat. Off. .
0160833 11/1985 European Pat. Off. .
0286094 10/1988 European Pat. Off. .
0291834 11/1988 European Pat. Off. .
8605613 9/1986 World Int. Prop. O. .

*Primary Examiner*—William L. Sikes
*Assistant Examiner*—Trong Phan
*Attorney, Agent, or Firm*—Roland Plottel

[57] ABSTRACT

A method of ratifying secret codes for IC memory cards including a data processing member and a storage device for recording a secret code and data delivered to the card. It consists in determining at least one fixed-size memory zone in the storage device or systematically writing at least one bit in said zone prior to each presentation of a secret code, and in erasing all of the bits recorded in the fixed-size zone once the data processor member observes that the presented secret code corresponds to the secret code recorded in the card.

8 Claims, 2 Drawing Sheets

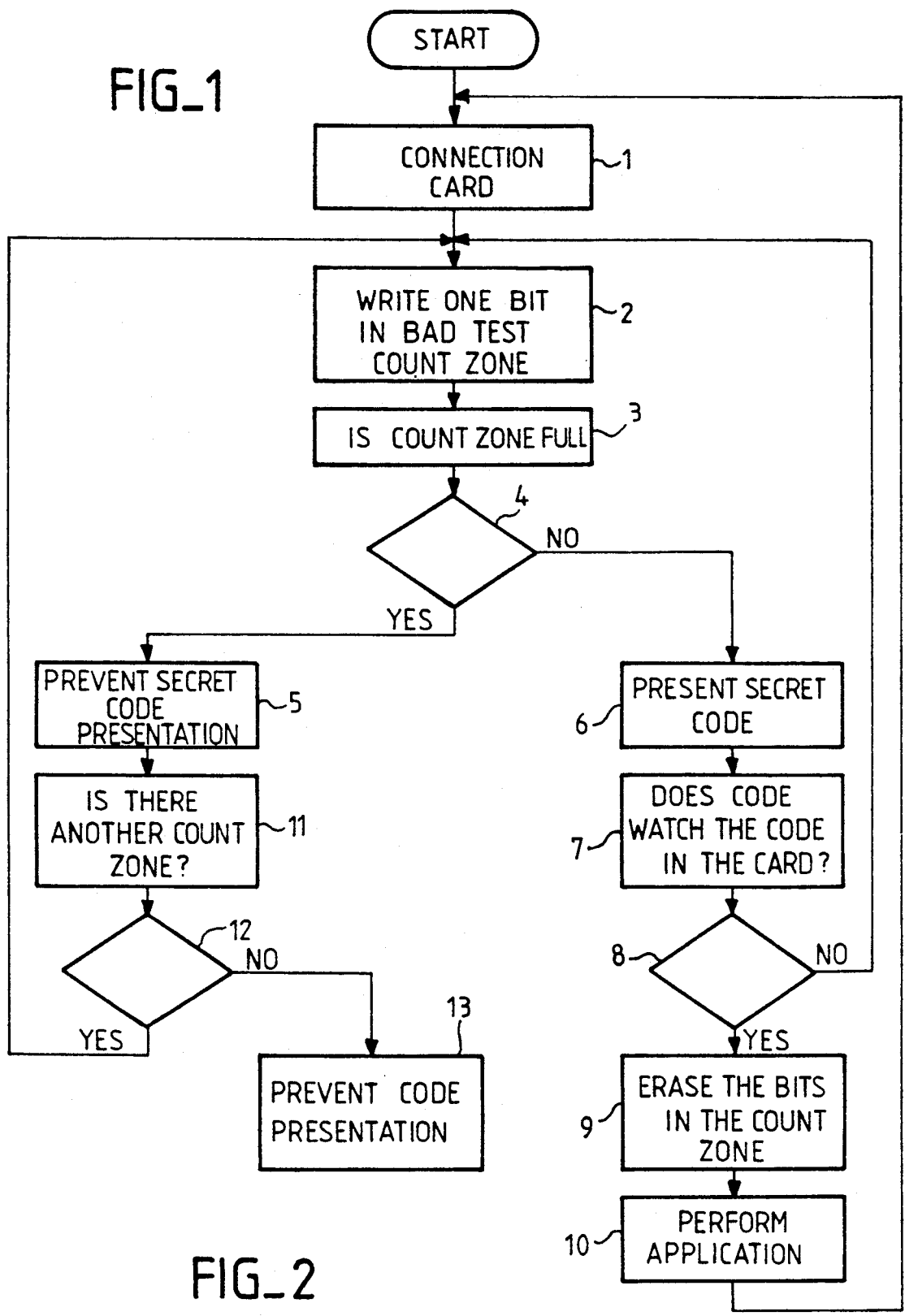

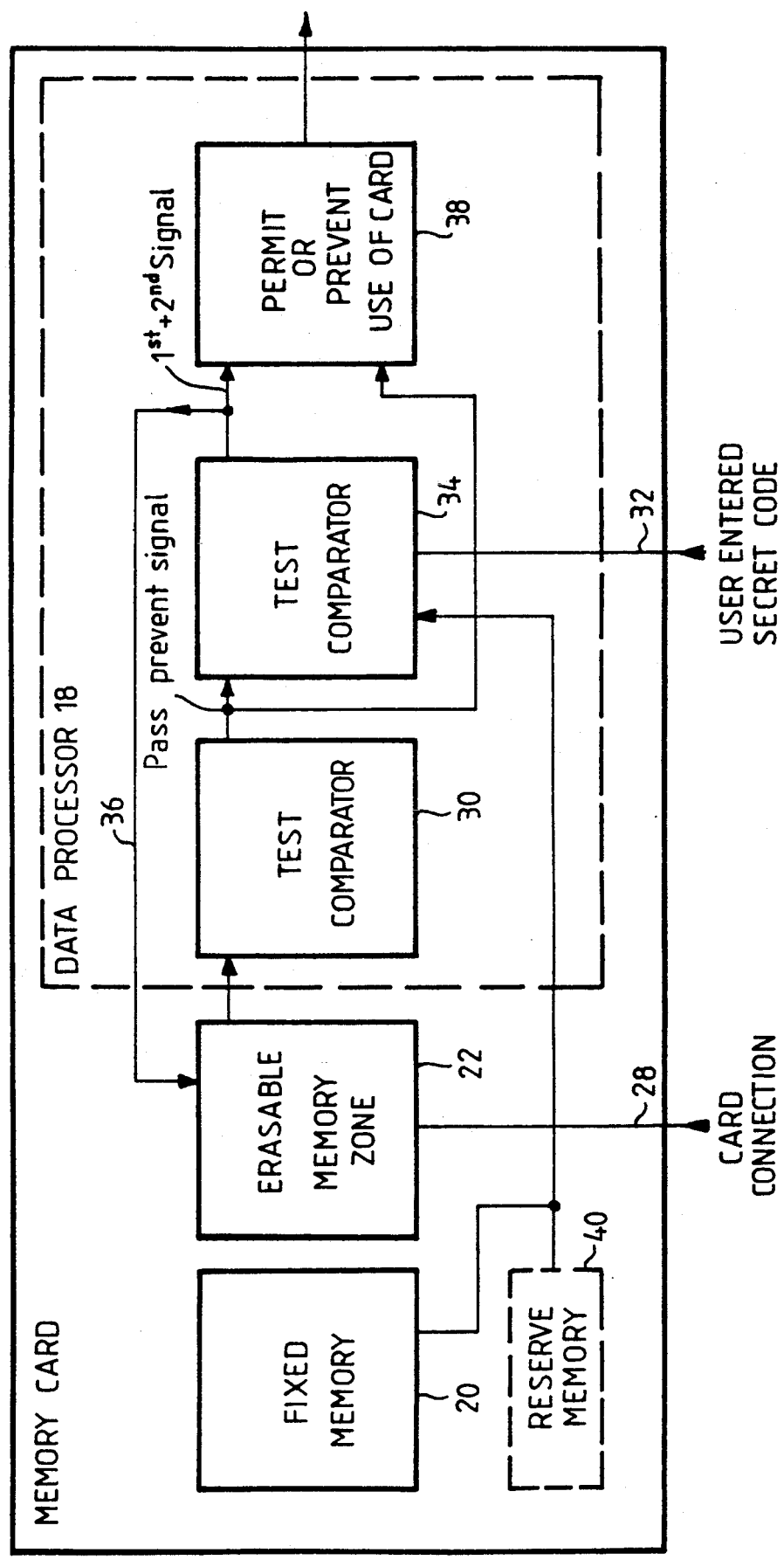

METHOD OF RATIFYING SECRET CODES FOR MEMORY CARDS

The present invention relates to a method of ratifying secret codes for memory cards.

It is particularly applicable to implementing integrated circuit cards known as "IC" cards for use in any system where access to information or to services is under strict control. This applies in particular to bank note dispenser systems, to pay TV systems, to systems for dispensing fuel for vehicles or for heating, to systems giving access to the telephone network, to systems giving access to data bases, etc. . . . .

BACKGROUND OF THE INVENTION

In prior systems, access to information or to services is authorized only on presentation of a secret code, which code is compared directly or otherwise with a secret code recorded in a non-volatile memory of the memory card.

In most general terms, a card comprises one or more ICs having circuits etched thereon to form both a storage device and a processor member constituted by a microprocessor or by an equivalent electronic device (e.g. hard-wired logic). The storage device generally includes ROM or EEPROM type non-volatile memory containing the microprograms required to operate the card and/or a RAM type working memory for storing data and instructions specific to each application.

A special memory zone is conventionally provided in the non-volatile EEPROM memory for use in monitoring the presentation of secret codes. In known embodiments, the operating program of the microprocessor has the task of writing one or more bits in said memory zone each time a secret code is presented, regardless of whether it is presented correctly or not, thereby making it possible to prevent additional secret codes being presented after a determined number of wrong presentations. For example, in one known embodiment, the memory zone reserved for ensuring security during secret code presentation is divided into two zones: a first zone has one bit written therein on each successful attempt at presenting a secret code; and a second zone has one bit written therein on each unsuccessful attempt at presenting a secret code. This solution has the advantage of drawing an identical amount of current regardless of whether the attempt is successful or not, thereby preventing a fraudulent user obtaining information as to whether attempts are successful or otherwise on each occasion that an access code is keyed into the card, merely by observing the current drawn by the card.

However, this solution suffers from several drawbacks including firstly occupying a considerable amount of data storage space, and secondly wasting additional data storage space for a card that possesses a plurality of secret codes each associated with its own zone.

Finally, when the secret code presentation zones are saturated, the secret code associated with the card can no longer be used and the card must be thrown away.

The object of the invention is to mitigate the above drawbacks.

SUMMARY OF THE INVENTION

To this end, the present invention provides a method of ratifying secret codes for IC memory cards including a data processing member and a storage device for recording a secret code and data delivered to the card, wherein the method consists in determining at least one fixed-size memory zone in the storage device for systematically writing at least one bit in said zone prior to each presentation of a secret code, and in erasing all of the bits recorded in the fixed-size zone once the data processor member observes that the presented secret code corresponds to the secret code recorded in the card.

BRIEF DESCRIPTION OF THE DRAWINGS

An implementation of the invention is described by way of example with reference to the accompanying drawings, in which:

FIG. 1 is a flow chart showing one implementation of the method of the invention; and FIG. 2 is a bit map showing the format of a memory zone for recording secret code attempts.

FIG. 3 is a schematic block diagram showing the invention.

DETAILED DESCRIPTION

The method of the invention is represented by steps 1 to 13 of the flow chart of FIG. 1, and is shown in the schematic block diagram of FIG. 3, and it consists of a data processor 18 and fixed memory 20 and erasable memory 22 with a reserved zone of constant but parameterizable size in the data memory of the card for systematically writing one bit therein prior to a secret code being presented, and for erasing all of the bits in said zone if the presented secret code is correct. Use of the card or presentation of secret codes is inhibited should the maximum number of bits be reached. Thus, considering the memory zone 22 having N positions of the type shown in FIG. 2, once all N positions are in the binary 1 state after N unsuccessful attempts, then any further attempts at obtaining access by additional confidential codes are forbidden.

In the example of FIG. 2, only two positions are already occupied, which means that two secret codes have already been presented incorrectly to the card. However, if the code is presented successfully thereafter, before all N positions take up the binary 1 state, then all of the positions previously put into the 1 state are cleared to zero.

In the flow chart of FIG. 1, the method begins at steps 1 and 2 by writing one bit into the zone 22 for counting unsuccessful attempts as soon as the card is connected 28 to external equipment for obtaining services from said equipment.

At steps 3 and 4 a test is performed in a test comparison circuit to verify the status of the count zone. If the count zone is full in step 3, then the method at step 5 prevents the secret code associated with the count zone being presented by user e.g. at an input 32. Otherwise, if the count zone is not full in step 3, then a secret code may be presented at step 6, and when the secret code is presented, a test takes place in test comparison circuit 34 at step 7 to verify that the secret code presented corresponds to the secret code recorded in the card. If this test discovers that the secret code presented does not correspond to the secret code recorded in the card, then the method returns to step 2 to write an additional bit, by lead 36, in the zone 22 for counting unsuccessful attempts. However, if the test performed at step 7 recognizes the presented secret code as corresponding to the secret code recorded in the card, then, sending a signal to a control circuit 38 which permits or prevents further use of the card, and the method passes to step 9 where all of the bits already recorded in the unsuccessful attempt count zone are erased, and then moves on to step 10 authorizing execution of the application for which the card is programmed. After this processing, the card may be removed from the external apparatus, and steps 1 and 2 may optionally be repeated by reconnecting the card to said external equipment.

When the presentation of further secret codes is prevented in step 5, the method may perform a test in steps 11 and 12 to verify whether there exists some other zone 40 in the storage device of the card for counting unsuccessful attempts. If so, the method returns to executing steps 2 and 3. Otherwise, the presentation of secret codes continues to be prevented in step 13.

Any convenient or conventional circuitry may be used to implement the invention, and it is within the skill of a man in the art to do so. For example, a microprocessor might be used and programmed for FIGS. 2 and 3, or a dedicated hard wired circuit might be employed, or a combination of the two.

I claim:

1. A method of ratifying secret codes for IC memory cards which cards include a data processing member, and a storage device for recording a secret code and data delivered to the card, wherein the method comprises writing in at least one fixed-size memory zone in the storage device at least one bit in said zone prior to each presentation of a secret code, and in erasing all of the bits recorded in the fixed-size zone once the data processor member detects that the presented secret code corresponds to the secret code recorded in the card.

2. A method according to claim 1, further comprising preventing a secret code from being accepted when all of the fixed-size memory zone is occupied by bits written into said zone as a result of unsuccessful presentations of secret codes.

3. A method according to claim 1, wherein the size of the zone is parameterizable.

4. A method according to claim 1, further comprising reserving one or more additional fixed-size memory zones to enable the presentation of secret codes to be used when one zone is full.

5. A method according to claim 4, wherein the bits written in the fixed-size memory zone and in the additional zone(s) are erased when the presented code corresponds to the secret code recorded in the card.

6. A device for ratifying secret codes comprising an IC memory card including a data processing member and a storage device for recording a secret code and data delivered to the card, at least one fixed-size memory data zone means in the storage device for systematically writing at least one bit in said memory zone means prior to each presentation of a secret code, and means for erasing all of th bits recorded in the fixed-size memory zone means once the data processor member observes that the presented code corresonds to the secret code recorded in the card.

7. A security circuit for a memory card comprising
a fixed memory in said card containing a secret code;
an erasable memory in said card for storing a predetermined number of bits from 0 to n bits;
means for adding a bit to said erasable memory before a secret code is entered by a user of the card; and
means for comparing said user entered secret code with said secret code in said fixed memory and for resetting said erasable memory when said codes agree.

8. A security circuit for a memory card comprising
(a) a fixed memory in said card containing a secret code;
(b) an erasable memory in said card for storing a predetermined number of bits;
(c) means for applying a bit to said erasable memory before a secret code is entered by a user of the card;
(d) means for determining if said erasable memory for the storage of bits has less than or is at the predetermined number, and for generating a pass signal if less than the predetermined number and for generating a prevent signal if at the predetermined number; and
(e) means activated by said pass signal for comparing said user entered secret code with said secret code in fixed memory and for generating a first signal when said codes agree, and for generating a second signal when said codes do not agree;
(f) means responsive to said prevent signal or to said second signal to prevent further use of the card; and
(g) means responsive to said first signal for resetting the erasable memory to the beginning of said predetermined number of bits, and for permitting further use of the card.

* * * * *